United States Patent
Uehara

(10) Patent No.: US 6,435,484 B1
(45) Date of Patent: Aug. 20, 2002

(54) ABSORBER

(76) Inventor: Haruo Uehara, 1544-119, Ooaza-Kinryu, Kinryu-Machi, Saga-Shi, Saga-Ken (JP)

(*) Notice: Subject to any disclaimer, the term of this patent is extended or adjusted under 35 U.S.C. 154(b) by 0 days.

(21) Appl. No.: 09/550,290

(22) Filed: Apr. 14, 2000

(30) Foreign Application Priority Data

May 31, 1999 (JP) ............................................. 11-152891

(51) Int. Cl.$^7$ .................................................. B01F 3/04
(52) U.S. Cl. ....................... 261/153; 261/155; 261/156; 261/112.1; 165/118; 165/DIG. 172
(58) Field of Search ............................. 261/112.1, 152, 261/153, 155, 156; 165/115, 118, DIG. 172

(56) References Cited

U.S. PATENT DOCUMENTS

| | | | | |
|---|---|---|---|---|
| 1,910,199 A | * | 5/1933 | Brady | 261/155 |
| 3,292,998 A | * | 12/1966 | James | 261/153 |
| 3,318,588 A | * | 5/1967 | Russell et al. | 261/153 |
| 3,499,734 A | * | 3/1970 | Newman et al. | 261/152 |
| 3,969,081 A | * | 7/1976 | Jackson | 261/153 |
| 4,641,706 A | * | 2/1987 | Haynie | 261/153 |
| 5,178,210 A | * | 1/1993 | Guillet et al. | 261/153 |
| 5,893,410 A | * | 4/1999 | Halbrook | 261/153 |

FOREIGN PATENT DOCUMENTS

| | | | | |
|---|---|---|---|---|
| FR | 657126 A | * | 5/1929 | 261/155 |

* cited by examiner

*Primary Examiner*—C. Scott Bushey
(74) *Attorney, Agent, or Firm*—Rader, Fishman, &Grauer, PLLC; Ronald P. Kananen

(57) ABSTRACT

An absorber having a shell, wet tubes and cooling fluid supply and collection portions. Partition walls divide the shell into at least three zones. The wet tubes are disposed parallelly in the shell, passing through the partition walls. The opposite open ends of the wet tube locate in the uppermost and lowermost zones of the shell, respectively. The cooling fluid supply portion communicates with the open end of the wet tube to supply a cooling fluid thereto. The cooling fluid collection portion communicates with the other open end of the wet tube and discharge it outside. A gap is formed between the wet tube and the partition walls facing the intermediate zone. The cooling fluid continuously flows in the wet tubes, while supplying the liquid working fluid to the uppermost zone so as to flow down from the gap. The liquid working fluid flows through the gap to the zone locating below the intermediate zone and is discharged outside. The gaseous working fluid is supplied to the intermediate zone so as to come into contact with the liquid working fluid flowing on the outer peripheral surfaces of the wet tubes.

4 Claims, 9 Drawing Sheets

ABSORBER

BACKGROUND OF THE INVENTION

1. Field of the Invention

The present invention relates to an absorber for causing a liquid working fluid to absorb a gaseous working fluid, and especially to an absorber, which has economical advantages and can improve thermal efficiency in a plant.

2. Description of the Related Art

In general, an interchange of heat between a working fluid and high and low temperature fluids is made in a plant of electric generation by temperature difference, steam power and the like, so as to take power off in a cycle of causing compression, evaporation, expansion and condensation. In a refrigerator and a heat pump, work for the working fluid is done and absorption or emission of heat between the working fluid and the high and low temperature fluids is made in a cycle of compression, evaporation, expansion and condensation.

There has conventionally been proposed a specific cycle in which mixing fluid of fluid such as ammonia having a low boiling point with fluid such as water having a high boiling point is used as the working fluid in order to improve the thermal efficiency in the above-mentioned power cycle or a refrigeration (heat pump) cycle, when there is no substantial difference in temperature between the high temperature fluid and the low temperature fluid.

There is a demand for decreasing a heat transfer area of a condenser as well as an amount of the supplied low temperature fluid to reduce a cost. In view of such a demand, there has been proposed a method in which an absorber is incorporated into the cycle. In the absorber, the liquid working fluid, which has been discharged from an evaporator to be separated once, is caused to absorb vapor of the working fluid, which has been discharged from an expansion device (i.e., a turbine). Latent heat of condensation and heat of absorption during the absorption process are recovered simultaneously by means of the low temperature fluid or the other cooling fluid. Vapor of the working fluid, which has not been absorbed, is supplied to the condenser. Quantity of heat given to the condenser can be decreased in this manner in the above-mentioned method.

An example of the power cycle into which the above-described absorber is incorporated is shown in FIG. 9. FIG. 9 is a schematic descriptive view of the power cycle including the absorber.

The conventional power cycle as shown in FIG. 9 has an evaporator 101 for making a heat exchange between the liquid working fluid and the high temperature fluid to evaporate partially the working fluid, a gas-liquid separator 102 for separating the working fluid going out of the evaporator 101 into a gaseous phase content and a liquid phase content, a regenerator 103 for preheating the liquid working fluid, which has been separated by the gas-liquid separator 102, prior to the entrance of the liquid working fluid into the evaporator 101, a pressure-reducing valve 104 for reducing pressure of the liquid working fluid going out of the regenerator 103, a turbine 105 for causing the gaseous working fluid, which has been separated by the gas-liquid separator 102, to flow and expand to take the power off, an absorber 106 for bringing the gaseous working fluid going out of the turbine 105 into contact with the liquid working fluid going out of the pressure-reducing valve 104, a condenser 107 for condensing the gaseous working fluid of the whole working fluid going out of the absorber 106, a tank 108 for collecting the working fluid going out of the condenser 107 and a pump 109 for imparting a prescribed pressure to the working fluid going out of the tank 108 to supply the working fluid to the regenerator 103 and the evaporator 101.

The conventional absorber is used to cause the liquid working fluid to absorb the gaseous working fluid in a plant such as a chemical plant, a food plant or the like.

Calculation proves that the conventional power cycle having the above-described structure can improve the thermal efficiency in the cycle by causing the liquid working fluid to absorb the gaseous working fluid in the absorber 106. There has however been a problem of incorporating the absorber 106 into the actual plant having the power cycle to make it for practical use.

SUMMARY OF THE INVENTION

An object of the present invention, which was made to solve the above-described problems is therefore to provide an absorber, which permits to achieve effective absorption of gaseous working fluid with the use of liquid working fluid, reduce costs of a plant or equipment in which a cycle such as a power cycle including an absorption process is utilized and improve thermal efficiency.

In order to attain the aforementioned object, an absorber of the present invention, in which working fluid including at least two substances having different boiling points from each other is divided into liquid and gaseous phases to supply separately liquid working fluid and gaseous working fluid so as to bring the gaseous working fluid into contact with the liquid working fluid to absorb the gaseous working fluid, comprises:

a shell having a box-shape, said shell having an inside that is divided into at least three zones by at least two parallel partition walls, and said at least three zones locating vertically;

a plurality of wet tubes, said wet tubes comprising tubular bodies each having opposite open ends and two surfaces being opposite in parallel to each other at a prescribed distance, said tubular bodies being disposed in parallel with each other in said shell so that a central axis of each of said tubular bodies coincide with a vertical direction and said surfaces of said tubular bodies are opposite in parallel to each other, said tubular bodies passing through said at least two parallel partition walls so that the opposite open ends of each of said tubular bodies locate in an uppermost zone and a lowermost zone of said at least three zones of the shell, respectively;

a cooling fluid supply portion communicating with the open end of each of said wet tubes to supply a cooling fluid to each of said wet tubes; and a cooling fluid collection portion communicating with the other open end of each of said wet tubes to collect the cooling fluid in the wet tubes and discharge it outside;

a gap having a prescribed distance being formed between each of upper and lower partition walls of said at least two parallel partition walls, which face an intermediate zone locating between other zones of said at least three zones, on the one hand, and an outer peripheral surface of each of said wet tubes passing through said at least two parallel partition walls, on the other hand; and (i) the cooling fluid continuously flowing in said wet tubes, while supplying the liquid working fluid from an outside to the zone locating above said intermediate zone so as to be adjacent thereto so that the liquid working fluid continuously flows down from the gap formed between said upper partition wall and said wet tubes along the outer peripheral surface of each of the wet tubes and the liquid working fluid flows through the gap formed between said lower partition wall and said wet tubes to the zone locating below said intermediate zone so as to adjacent thereto and is discharged outside, and (ii) the gaseous working fluid is supplied from the outside to the intermediate zone of said shell so as to come into contact with the liquid working fluid flowing on the outer peripheral surfaces of the wet tubes.

According to the present invention, by providing the wet tubes comprising the tubular bodies in the shell having the box-shape, causing the cooling fluid to pass through the inside of the wet tubes and causing the liquid working fluid to flow down along the outer peripheral surface of the wet tubes so as to make a heat exchange between the working fluid and the cooling fluid through the wet tubes, while supplying the gaseous working fluid into the shell, so as to bring the gaseous working fluid into contact with the liquid working fluid to absorb the gaseous working fluid, it is possible to convert a part of the gaseous working fluid into the liquid working fluid to reduce an amount of vapor to be supplied into the condenser and recover part of heat, which has been used for the heat exchange in the condenser, as heat corresponding to the increased temperature of the liquid working fluid. As a result, the heat transferring area of the condenser can be reduced to make the condenser in a small size. In addition, it is possible to decrease the quantity of heat, which is to be transferred to the cooling liquid in the condenser to discharge outside, thus improving the thermal efficiency of the cycle. The gaps formed between the outer peripheral surface of the wet tube and the partition walls are used as an inlet and an outlet for the liquid working fluid, which is to be supplied into the intermediate zone of the shell, so that an appropriate amount of the working fluid passes through the gap and flows down along the outer peripheral surface of the wet tube. It is therefore possible to ensure the maximum contact area between the liquid working fluid and the gaseous working fluid in a state of permission of making a heat exchange so as to provide an excellent absorption efficiency, thus leading to an easy manufacture of the absorber having a simple structure at low cost.

There may be adopted, as the occasion demands, a structure that each of the surfaces of said wet tubes has a pattern of irregularity, said pattern of irregularity having a common concavo-convex shape to each other and an inverse relationship in concavo-convexities that appear on a working fluid-side and a cooling fluid-side, said concavo-convex shape having a wavy cross section, which extends in a flowing direction of the liquid working fluid in a shape of elongated projections or grooves that are arranged in parallel with each other in a perpendicular direction to said flowing direction by a prescribed pitch.

According to the present invention, by forming on the wet tubes the pattern of irregularity having the concavo-convex shape, which extends in the flowing direction of the working fluid so as to cause the liquid working fluid to flow down along the pattern of irregularity, it is possible to ensure the large heat transferring area and achieve the smooth flow-down of the liquid working fluid to make a stable contact with the wet tubes. It is therefore possible to improve the heat transfer efficiency from the liquid working fluid, which has absorbed the gaseous working fluid, to the cooling fluid through the wet tubes, so as to make a rapid heat transfer, thus permitting more effective absorption of the working fluid, while preventing re-evaporation of the absorbed working fluid.

There may be adopted, as the occasion demands, a structure that a supply port for the gaseous working fluid is formed in said intermediate zone so as to communicate with a lower portion of said intermediate zone and a discharge port for the gaseous working fluid, which has not been absorbed, is formed in said intermediate zone so as to communicate with an upper portion of said intermediate zone.

According to the present invention, by forming the supply port for the gaseous working fluid on the side surface of the shell so as to communicate with the lower portion of the intermediate zone and forming the discharge port for the gaseous working fluid thereon so as to communicate with the upper portion of the intermediate zone, it is possible to make a flow of the gaseous working fluid as an ascending current so that the gaseous working fluid can flow from the upper portion of the intermediate zone to the lower portion thereof, thus forming a countercurrent flow relative to the liquid working fluid flowing down. As a result, an effective heat transfer of the gaseous working fluid to the liquid working fluid can be made without causing loss to improve the thermal efficiency. In addition, it is possible to bring the gaseous working fluid into sure contact with the liquid working fluid, thus improving the absorption efficiency.

DETAILED DESCRIPTION OF THE PREFERRED EMBODIMENTS

Figure 1:
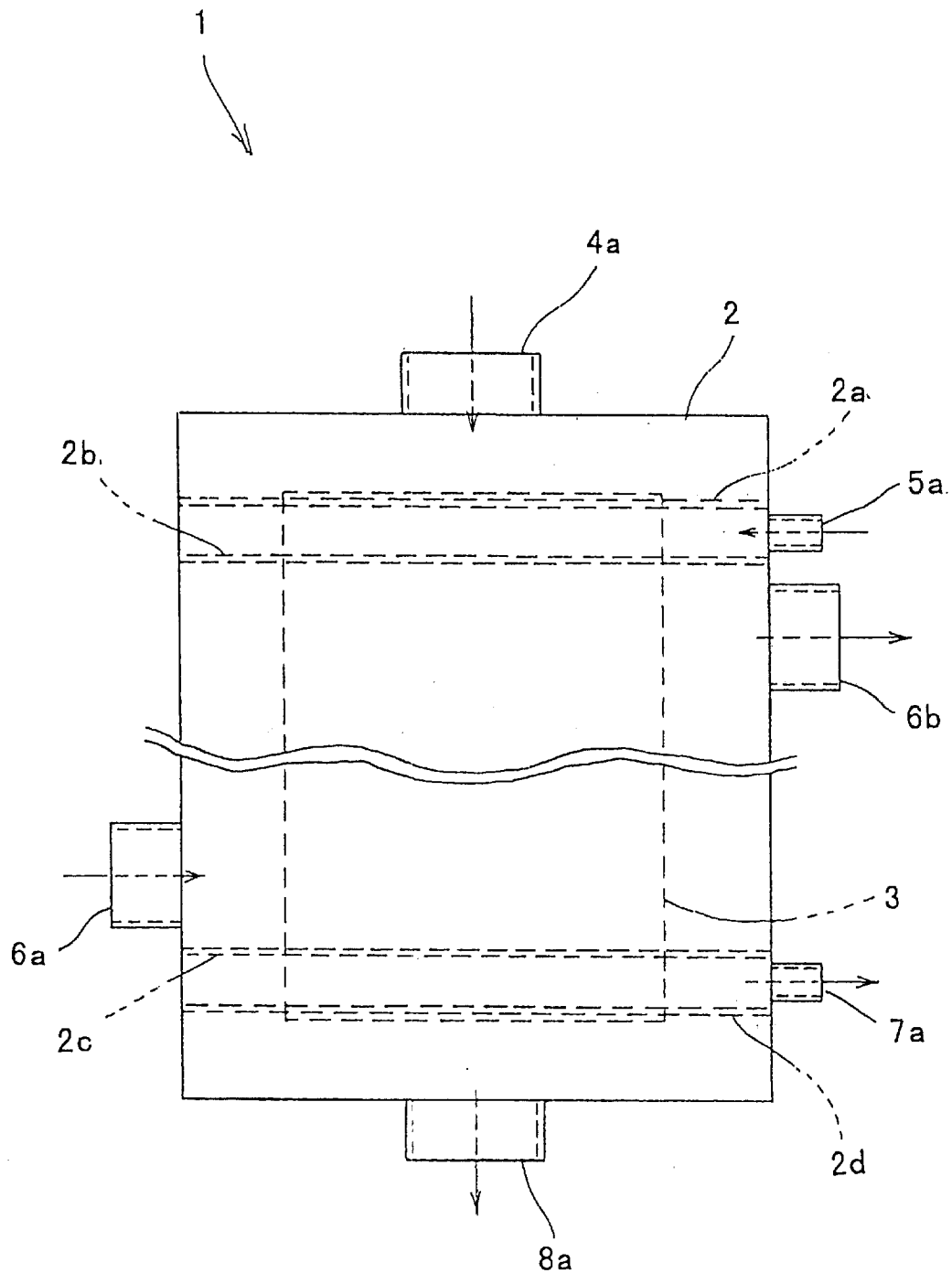
FIG. 1 is a side view illustrating an absorber of an embodiment of the present invention in an installed state.
Figure 2:
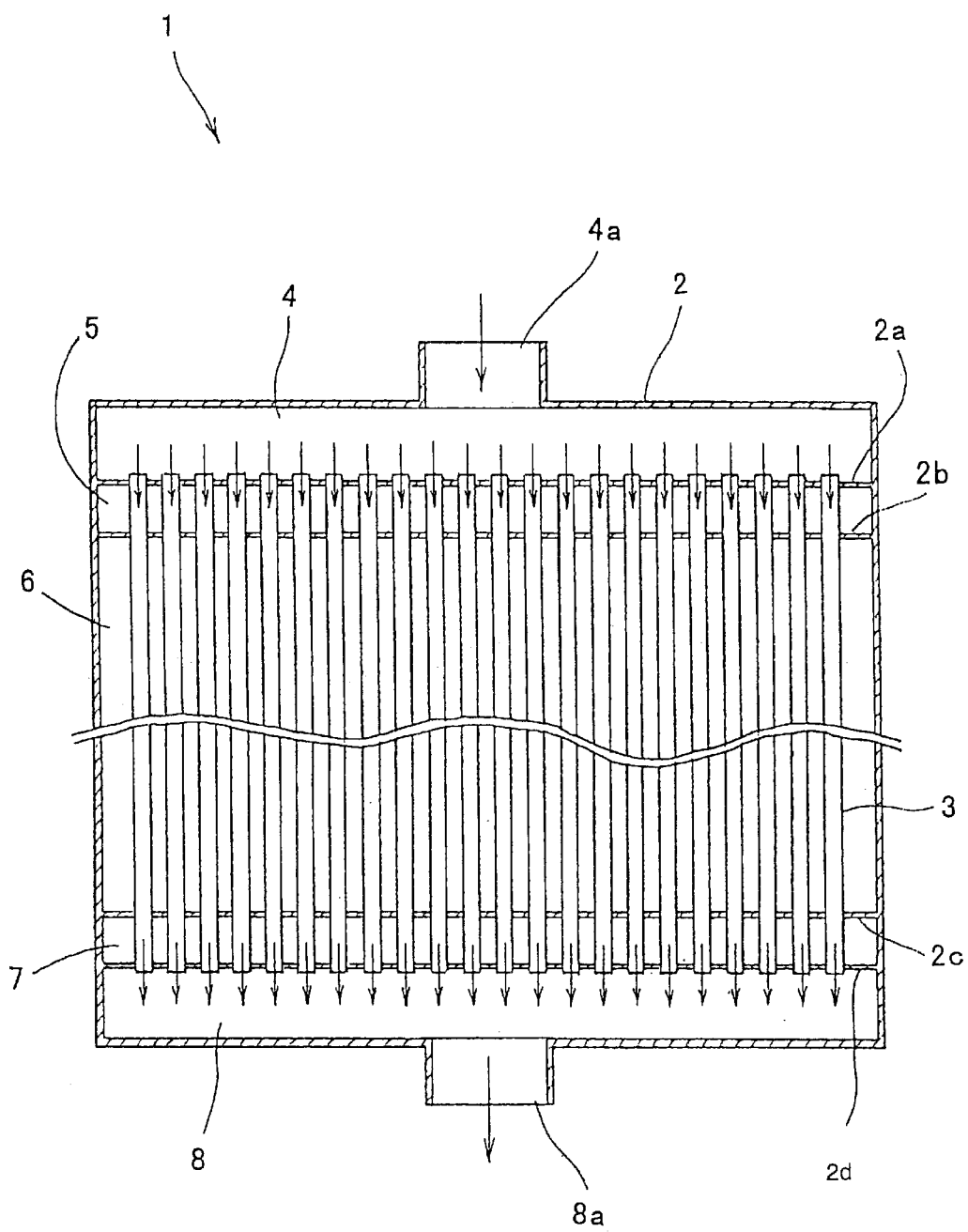
FIG. 2 is a longitudinal cross-sectional view of the absorber of the embodiment of the present invention.
Figure 3:
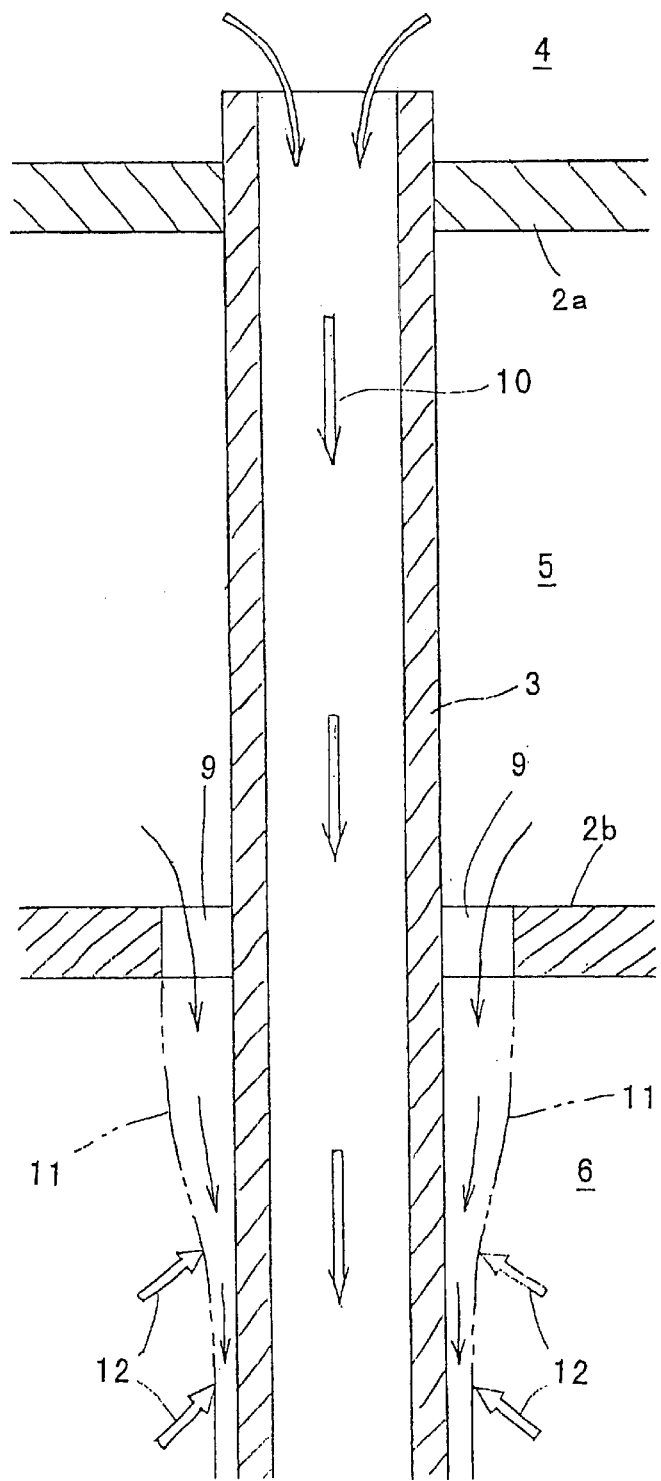
FIG. 3 is a cross-sectional view of the essential part of the absorber of the embodiment of the present invention.
Figure 4:
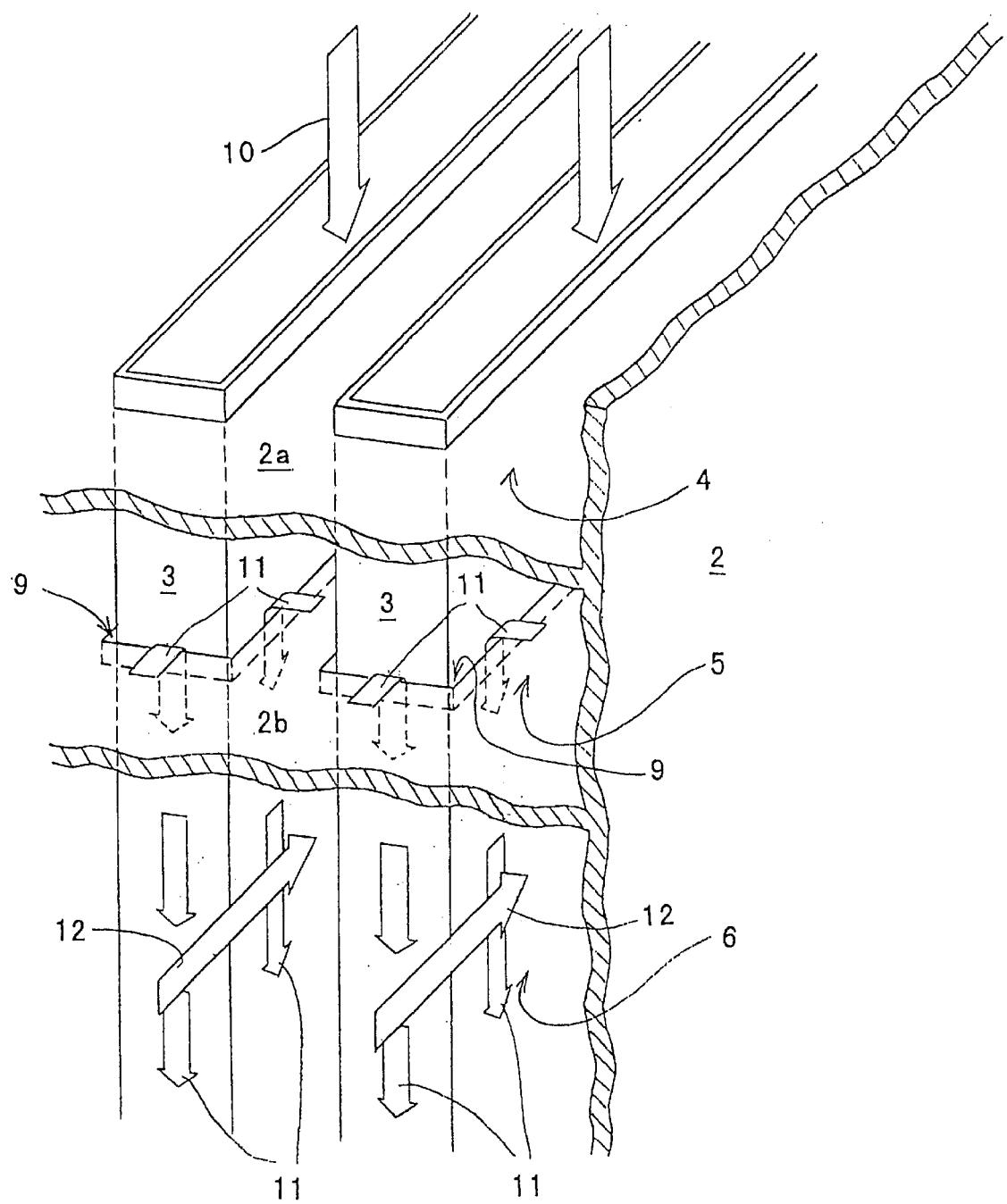
FIG. 4 is a perspective view of the upper portion of the absorber of the embodiment of the present invention, which has a partial sectioned portion.
Figure 5:
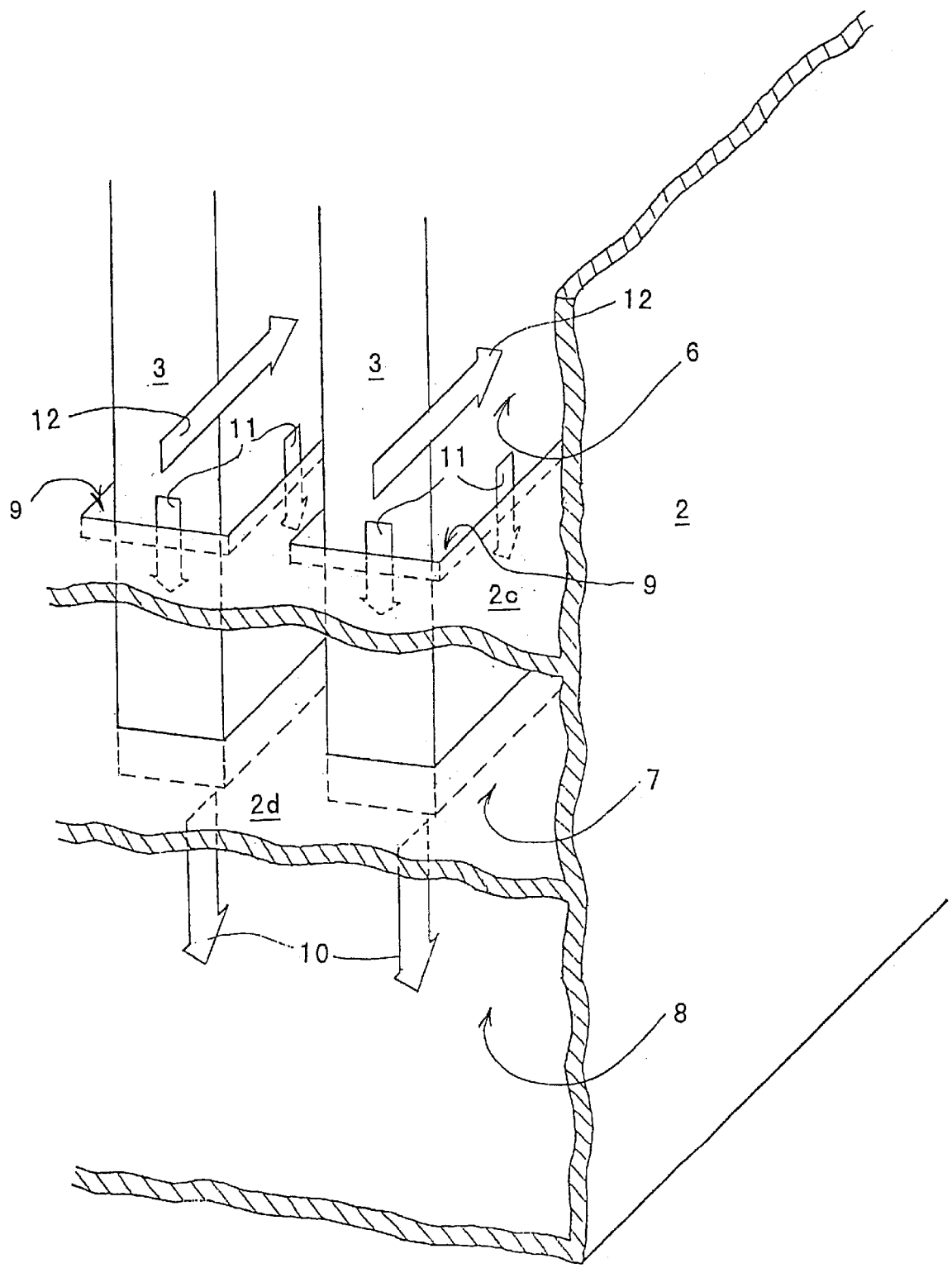
FIG. 5 is a perspective view of the lower portion of the absorber of the embodiment of the present invention, which has a partial sectioned portion.
Figure 6:
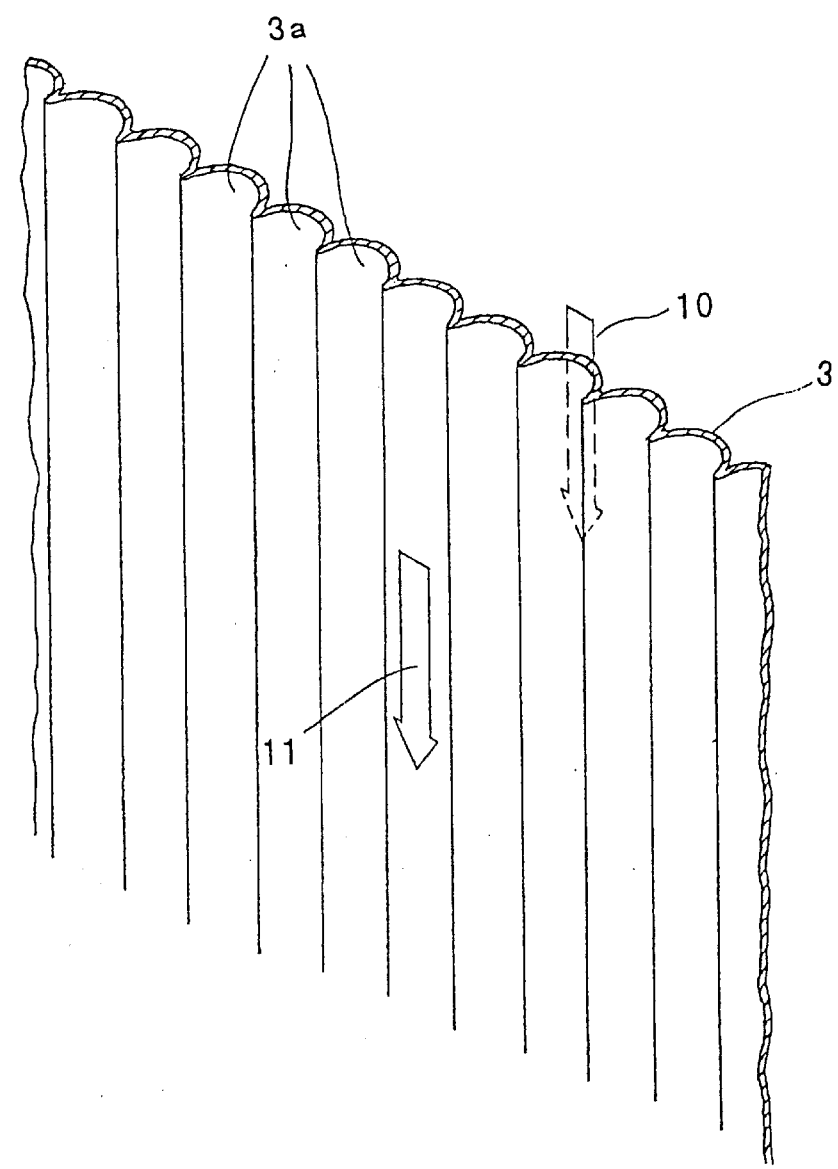
FIG. 6 is a perspective view of the essential part of the absorber of the embodiment of the present invention, which has a sectioned portion.

Now, an absorber of the embodiment of the present invention will be described in detail below with reference to FIGS. 1 to 6. The absorber of the embodiment of the present invention forms a part of the power cycle in which mixing fluid of ammonia serving as a low boiling point fluid with water serving as a high boiling point fluid is used as the working fluid. The other constructional components have the same reference numerals as those in the conventional power cycle described above and description thereof is omitted. FIG. 1 is a side view illustrating an absorber of an embodiment of the present invention in an installed state, FIG. 2 is a longitudinal cross-sectional view of the absorber of the embodiment of the present invention, FIG. 3 is a cross-sectional view of the essential part of the absorber of the embodiment of the present invention, FIG. 4 is a perspective view of the upper portion of the absorber of the embodiment of the present invention, which has a partial sectioned portion, FIG. 5 is a perspective view of the lower portion of the absorber of the embodiment of the present invention, which has a partial sectioned portion, and FIG. 6 is a perspective view of the essential part of the absorber of the embodiment of the present invention, which has a sectioned portion.

As shown in FIGS. 1 to 6, the absorber 1 of the embodiment of the present invention is composed of (i) a shell 2 formed of a rectangular box-shaped body, the inside of which is divided into five zones, i.e., an uppermost zone 4, a working fluid supply zone 5, an intermediate zone 6, a working fluid collection zone 7 and a lowermost zone 8 by means of four parallel partition walls 2a, 2b, 2c and 2d provided in the box-shaped body and (ii) a plurality of wet tubes 3, which are formed of tubular bodies. Each of the tubular bodies has opposite open ends and two surfaces, which are opposite in parallel to each other at a prescribed distance. The tubular bodies are disposed in parallel with each other in the shell 2 so that the central axis of each of the tubular bodies coincides with the vertical direction. The surfaces of the tubular bodies are opposite in parallel to each other. The tubular bodies pass through the partition walls 2a, 2b, 2c and 2d so that the opposite open ends of each of the tubular bodies locate in the uppermost zone 4 and the lowermost zone 8. A gap 9 having a prescribed distance is formed between each of the partition walls 2b and 2c, which face the intermediate zone 6, on the one hand, and the outer peripheral surface of each of the wet tubes 3 passing through the partition walls 2b and 2c, on the other hand. The uppermost zone 4, which communicates with the upper open ends of the wet tubes 3, serves as a cooling fluid supply portion to supply the cooling fluid 10 into the wet tubes 3. The lowermost zone 8, which communicates with the lower open ends of the wet tubes 3, serves as a cooling fluid collection portion to collect the cooling fluid 10 from the wet tubes 3.

The shell 2 has a cooling fluid inlet port 4a formed on the upper surface of the shell 2 for supplying the cooling fluid 10 into the uppermost zone 4 serving as the cooling fluid supply portion. The shell 2 also has an upper supply port 5a formed on the upper portion of the side surface of the shell 2 for supplying the liquid working fluid 11 into the working fluid supply zone 5. The shell 2 has a cooling fluid outlet port 8a formed on the lower surface of the shell 2 for discharging the cooling fluid 10 from the lowermost zone 8 serving as the cooling fluid collection portion. The shell 2 also has a lower discharge port 7a formed on the lower portion of the side surface of the shell 2 for discharging the liquid working fluid 11 from the working fluid collection portion 7. The lower portion of the side surface of the shell 2, which faces the intermediate zone 6, has an intermediate supply port 6a for supplying the gaseous working fluid 12. The upper portion of the opposite side surface of the shell 2, which faces the intermediate zone 6, has an intermediate discharge port 6b for discharging the gaseous working fluid 12.

The wet tubes 3 are made of metallic tubular bodies, which have a large aspect ratio and a rectangular cross-section. The wet tubes 3 locate vertically in the shell 2 so that their opposite end portions pass through the partition walls 2a, 2b, 2c and 2d, respectively. The wet tubes 3 are fixed, at their portions passing through the partition walls 2a and 2d, to the partition walls 2a and 2d so as to come close contact with the partition walls 2a and 2d without forming any gap. On the contrary, the wet tubes 3 do not come into contact with the partition walls 2b and 2c so as to form the gaps 9 between the wet tubes 3 and the partition walls 2b and 2c. The close contact of the wet tubes 3 with the partition walls 2a and 2d causes the uppermost zone 4 and the lowermost zone 8 to be isolated from the other zones, thus preventing the cooling fluid 10 and the working fluid 11 from mixing with each other. The formation of the gaps 9 between the wet tubes 3 and the partition walls 2b and 2c causes the working fluid supply zone 5 and the working fluid collection zone 7 to communicate with the intermediate zone 6. The wet tubes 3 have on their surfaces, which face the intermediate zone 6, a prescribed pattern of irregularity so as to increase the heat transferring area and improve the strength.

The pattern of irregularity of each of the wet tubes 3 has a common convavo-convex shape to each other and an inverse relationship in convaco-convexities that appear on the outer and inner sides of the wet tube 3. The concavo-convex shape has a wavy cross section, which extends in the vertical direction in a shape of elongated projections or grooves that are arranged in parallel with each other in the perpendicular direction to the vertical direction by a prescribed pitch. The above-mentioned wavy cross section can be obtained by arranging grooves 3a in parallel with each other, which have the width of from 0.5 mm to 1.5 mm (viewed from the working fluid side) by which the maximum coefficient of heat transfer from the working fluid can be provided under the conditions that mixing fluid of ammonia with water is used as the working fluid and seawater is used as the cooling fluid (see FIG.6). The pattern of irregularity having the wavy cross section, which extends in the vertical direction, i.e., the flowing direction of the working fluid 11 and the cooling fluid 10 in the shape of elongated projections or grooves, can control the flow of the fluids and guide smoothly them in the vertical direction.

Now, description will be given below of an absorption function of the absorber having the above-described construction.

The liquid working fluid (i.e., the mixed liquid including a low boiling point fluid content having a low concentration) is separated from the gaseous working fluid (i.e., the mixed vapor including a low boiling point fluid content having a high concentration) in the gas-liquid separator 102. A heat exchange of the above-mentioned liquid working fluid is made in the regenerator 103 so as to decrease the temperature of the liquid working fluid. The pressure-reducing valve 104 reduces the pressure of the liquid working fluid to a prescribed value. The liquid working fluid having such a reduced pressure is applied to the working fluid supply zone 5 of the shell 2 through the upper supply port 5a.

The cooling fluid 10 is supplied under a prescribed pressure into the uppermost zone 4 of the shell 2 through the cooling fluid inlet port 4a so that the cooling fluid 10 continuously flows down in the wet tubes 3 (see FIGS. 3 and 4).

The liquid working fluid 11, which has been supplied into the working fluid supply zone 5, passes through the gaps 9 between the partition wall 2b and the wet tubes 3 to flow down continuously along the outer peripheral surface of the wet tubes 3 (see FIGS. 3 and 4) so as to pass through the intermediate zone 6.

On the other hand, the gaseous working fluid 12 passing through the gas-liquid separator 102 and the turbine 105 is supplied continuously from the intermediate supply port 6a formed on the side surface of the shell 2 to the intermediate zone 6. The gaseous working fluid 12 moves upward in the opposite direction to the liquid working fluid 11 flowing down along the outer peripheral surface of the wet tubes 3 to reach the vicinity of the wet tubes 3 so as to come into contact with the liquid working fluid 11 flowing down.

The gaseous working fluid, which has come into contact with the liquid working fluid 11 flowing down, is absorbed by the liquid working fluid 11 outside the wet tubes 3, while emitting heat of absorption and latent heat to the cooling liquid 10 through the liquid working fluid 11 and the wet tubes 3 (see FIG. 3).

In this process, the cooling fluid 10 flowing down in the wet tubes 3 absorbs heat in a proper manner from the liquid working fluid 11, thus preventing the liquid working fluid 11 in which absorption has been completed, from re-evaporating due to the increased temperature caused by the absorption.

The absorption of the gaseous working fluid 12 by the liquid working fluid 11 causes increase in concentration of the fluid content having the low boiling point. The liquid working fluid 11 flows down along the outer peripheral surface of the wet tubes 3 and passes through the gaps 9 formed between the wet tubes 3 and the partition wall 2c to enter the working fluid collection zone 7 (see FIG. 5). The liquid working fluid 11, which has reached the working fluid collection zone 7, is discharged from the lower discharge port 7a formed on the lower portion of the shell 2. The discharged liquid working fluid (i.e., the mixed liquid including the low boiling point content having the high concentration) is supplied to the working fluid outlet side of the condenser 107 to gather with the condensate. The gaseous working fluid 12, which has not been absorbed, includes the low boiling point fluid content having the low concentration and is collected from the intermediate discharge port 6b formed in the opposite surface of the shell 2 and then is supplied to the condenser 107. The cooling fluid 10 absorbs heat from the liquid working fluid 11 in the wet tubes 3 and then enters the lowermost zone 8 from the inside of the wet tubes 3 (see FIG. 5). Then, the cooling fluid 10 is discharged from the lowermost zone 8 through the cooling fluid outlet port 8a.

In the absorber of the embodiment of the present invention, by providing the wet tubes 3 comprising the tubular bodies in the shell 2, causing the cooling fluid 10 to pass through the inside of the wet tubes 3 and causing the liquid working fluid 11 to flow down along the outer peripheral surface of the wet tubes 3 so as to make a heat exchange between the working fluid 11 and the cooling fluid 10 through the wet tubes 3, while supplying the gaseous working fluid 12 into the shell 2, so as to bring the gaseous working fluid 12 into contact with the liquid working fluid 11 flowing down to absorb the gaseous working fluid 12, it is possible to reduce an amount of the gaseous working fluid. As a result, the heat transferring area of the condenser can be reduced to make the condenser in a small size. In addition, it is possible to decrease the quantity of heat, which is to be transferred to the cooling liquid in the condenser to discharge outside, thus improving the thermal efficiency of the cycle.

In addition, there is formed on the wet tubes the pattern of irregularity having the concavo-convex shape, which extends in the vertical direction of the wet tubes 3. As a result, it is possible to cause the liquid working fluid 11 to flow down smoothly along the wet tubes 3 to make a sure contact with the wet tubes 3. Such a sure contact of the liquid working fluid 11 with the wet tubes 3 and increase in the heat transferring area can improve the heat transfer efficiency from the liquid working fluid 11 to the cooling fluid 10 through the wet tubes 3 to make a rapid movement of heat, thus preventing re-evaporation of the absorbed working fluid to improve the absorption efficiency. The gaps 9 formed between the outer peripheral surfaces of the wet tubes 3 and the partition wall 2b are used as inlets for supplying the liquid working fluid 11 into the intermediate zone 6 so that a prescribed amount of the working fluid 11 can continuously flow down from the gaps 9 along the outer peripheral surfaces of the wet tubes 3. As a result, it is possible to ensure the maximum contact area between the liquid working fluid 11 and the gaseous working fluid 12 in a state of permission of making a heat exchange relative to the cooling fluid 10 so as to provide an excellent absorption efficiency, thus leading to an easy manufacture of the absorber having a simple structure at low cost.

In the absorber of the above-described embodiment of the present invention, the wet tube 3 is composed of the tubular body having rectangular openings, which is formed of a single plate-shaped metallic material. The wet tube 3 may be formed by connecting two plate-shaped materials between which a spacer is held into a tubular body-shape having rectangular openings.

With respect to the supporting mechanism for supporting the wet tubes 3 in parallel with each other, the supporting structure utilizing the partition walls 2a and 2d is adopted. There may be adopted a structure that the wet tubes are arranged in parallel with each other so that a spacer is held between the adjacent two wet tubes, and are joined or welded to each other into an integral body. According to such a structure, it is possible to maintain an appropriate distance between the opposing surfaces of each of the wet tubes 3 and an appropriate distance between the adjacent two wet tubes 3, thus ensuring large area portions with which the liquid and gaseous fluids come contact into.

In the absorber of the above-described embodiment of the present invention, the pattern of irregularity of the portion of the wet tube 3, which faces the intermediate zone 6, has a wavy cross section, which is obtained by arranging the grooves 3a in parallel with each other, and has a common concavo-convex shape to each other and an inverse relationship in concavo-convexities that appear on the outer surface along which the liquid working fluid 11 flows and the inner surface along which the cooling fluid 10 flows. However, the pattern of irregularity is not limited to such a wavy cross section. More specifically, there may be adopted a structure that the inner surface of the wet tube 3, along which the cooling fluid 10 flows, is smooth so that the irregularity formed by the grooves 3a does appear thereon, while the irregularity appears on the outer surface of the wet tube 3, along which the liquid working fluid flows. The inner and outer surfaces of the wet tube 3 may have different surface shapes from each other in this manner. According to such a structure, it is possible to cause the working fluid to flow in a state in which the maximum heat transfer efficiency is provided, and cause the cooling fluid to flow in a proper manner, while preventing contaminants from staying on the inner surface of the wet tube 3, even when the cooling fluid includes such contaminants, thus maintaining the excellent heat transferring efficiency relative to the cooling fluid.

Figure 7:
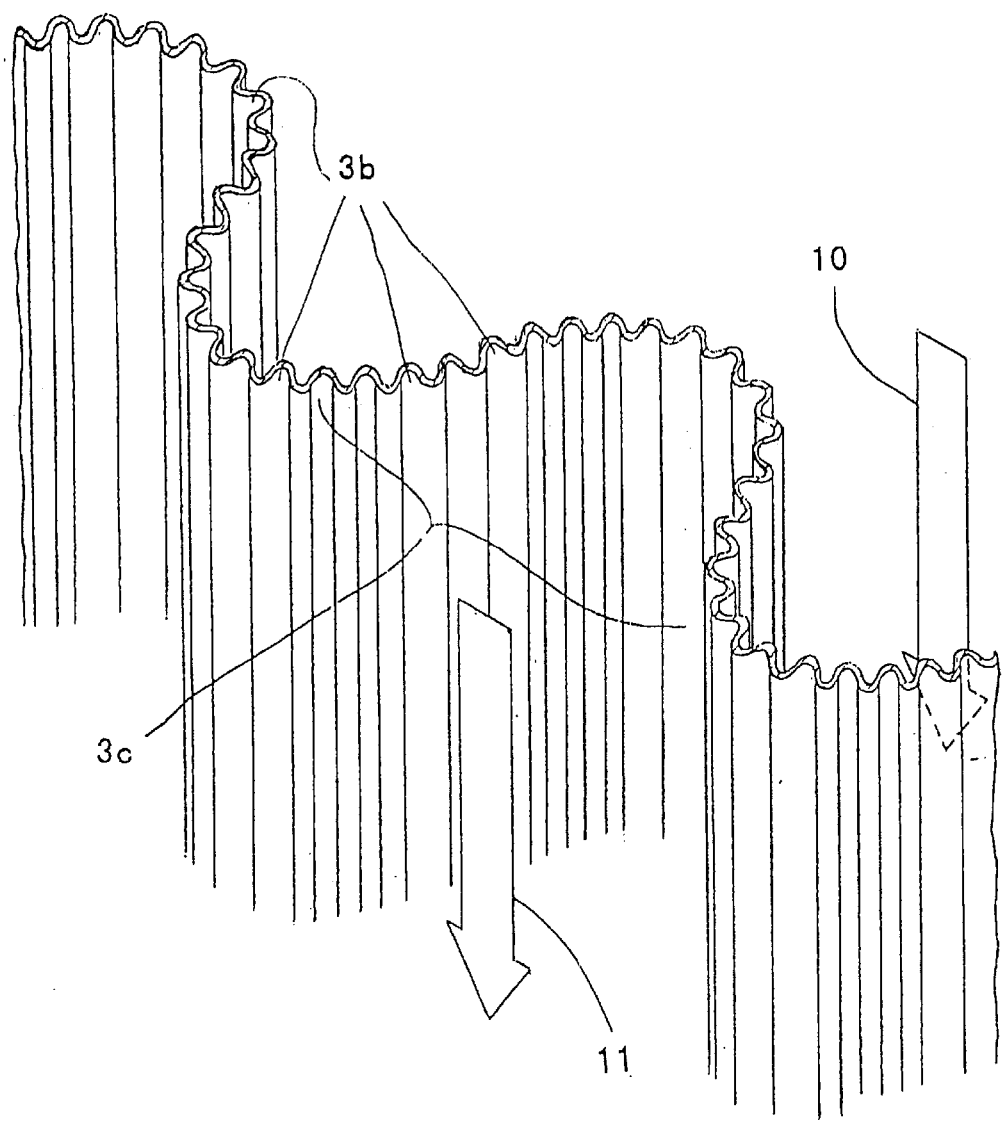
FIG. 7 is a perspective view of the essential part of the absorber of the other embodiment of the present invention; which has a sectioned portion.
Figure 8:
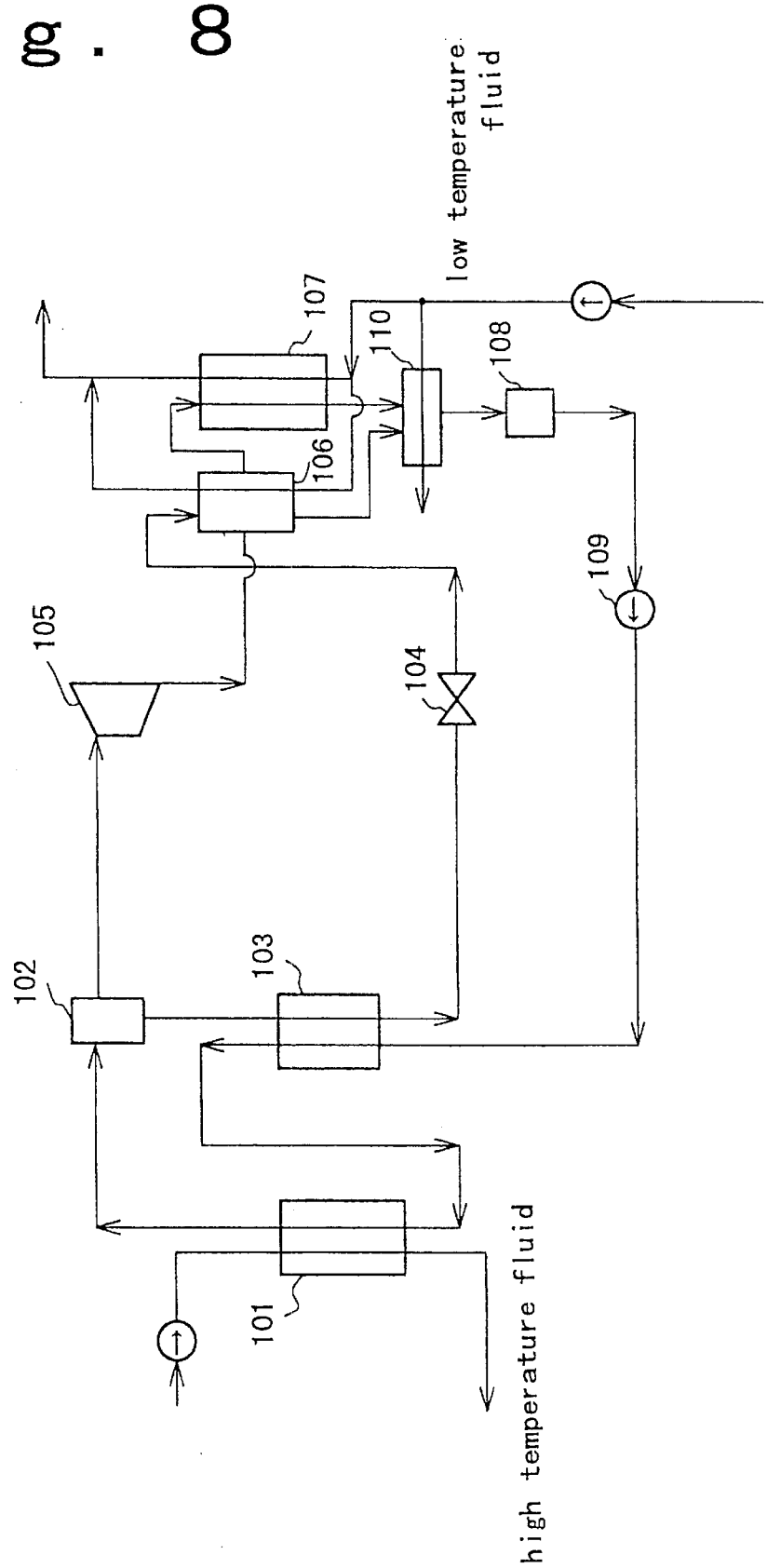
FIG. 8 is a schematic descriptive view of the power cycle to which the absorber of the embodiment of the present invention is applied.

In the absorber of the above-described embodiment of the present invention, the wavy cross section of the pattern of irregularity of the portion that faces the intermediate zone 6 of the wet tube 3 is be obtained by arranging grooves 3a in parallel with each other, which have the width by which the maximum coefficient of heat transfer from the liquid working fluid 11 can be provided. However, the pattern of irregularity may have a combined wavy cross section that can be obtained by combining the grooves 3b having a small width and the grooves 3c having a large width, which correspond to surface tensions of the fluids forming the mixed liquid as shown in FIG. 7 or arranging them alternatively or in sets of them so as to alter the arrangement of the grooves. In such a combined wavy cross section, the optimum heat transfer for each of the fluids can be provided.

The values of the width of the grooves are not limited only to those mentioned above. When the working and cooling fluids to be used are different in their kinds from those described above, the grooves may have their appropriate widths in accordance with the kinds of the fluids. When the working fluid has a large surface tension, or the portion of the wet tube 3 in which the pattern of irregularity is formed has a long distance, the enlarged pitch of the pattern of irregularity permits the improvement in the heat transfer efficiency and an easy formation of the pattern of irregularity.

In the absorber of the above-described embodiment of the present invention, the portion of the wet tube 3, which faces the intermediate zone 6, has the prescribed patter of irregularity.

When there is a difference in pressure between the working fluid 11 and the cooling fluid 10 between which the wet tube 3 exists, it is possible to bring convex portions of the pattern of irregularity of the wet tube 3 into a partial contact with convex portions of the pattern of irregularity of the opposing wet tube 3. Such a supporting system at the contact portions makes it possible to prevent the wet tube 3 from warping, thus maintaining a prescribed inner distance of the wet tube 3 and a prescribed distance between the adjacent two wet tubes 3.

Figure 9:
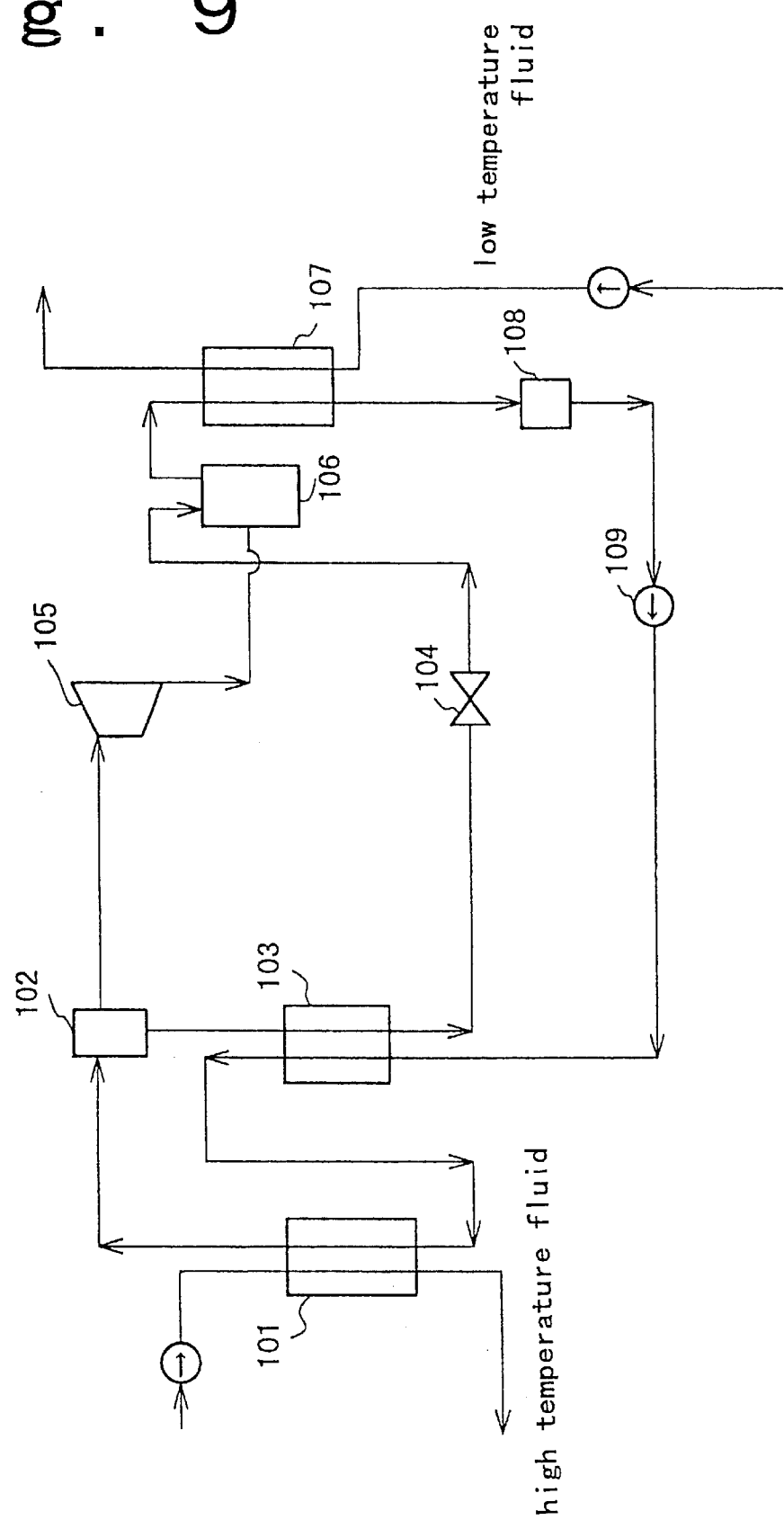
FIG. 9 is a schematic descriptive view of the power cycle including the absorber.

The absorber of the above-described embodiment of the present invention is used as the absorber 106 in the cycle in which an auxiliary condenser 110 is disposed after the absorber 106 and the condenser 107 of the power cycle (see FIG. 9). The absorber of the present invention may be used as the above-mentioned auxiliary condenser 110 so as to cause the liquid working fluid to absorb the gaseous working fluid, which has not been completely condensed, to supply surely the liquid working fluid into the tank 108. The absorber of the embodiment of the present invention may be used not only in the above-described power cycle, but also in a refrigerator, a heat pump, an absorption process in a chemical plant and the like.

According to the present invention as described in detail, by providing the wet tubes comprising the tubular bodies in the shell having the box-shape, causing the cooling fluid to pass through the inside of the wet tubes and causing the liquid working fluid to flow down along the outer peripheral surface of the wet tubes so as to make a heat exchange between the working fluid and the cooling fluid through the wet tubes, while supplying the gaseous working fluid into the shell, so as to bring the gaseous working fluid into contact with the liquid working fluid to absorb the gaseous working fluid into the liquid working fluid to reduce an amount of vapor to be supplied into the condenser and recover part of heat, which has been used for the heat exchange in the condenser, as heat corresponding to the increased temperature of the liquid working fluid. As a result, the heat transferring area of the condenser can be reduced to make the condenser in a small size. In addition, it is possible to decrease the quantity of heat, which is to be transferred to the cooling liquid in the condenser to discharge outside, thus improving the thermal efficiency of the cycle. The gaps formed between the outer peripheral surface of the wet tube and the partition walls are used as an inlet and an outlet for the liquid working fluid, which is to be supplied into the intermediate zone of the shell, so that an appropriate amount of the working fluid passes through the gap and flows down along the outer peripheral surface of the wet tube. It is therefore possible to ensure the maximum contact area between the liquid working fluid and the gaseous working fluid in a state of permission of making a heat exchange so as to provide an excellent absorption efficiency, thus leading to an easy manufacture of the absorber having a simple structure at low cost.

According to the present invention, by forming on the wet tubes the pattern of irregularity having the concavo-convex shape, which extends in the flowing direction of the working fluid so as to cause the liquid working fluid to flow down along the pattern of irregularity, it is possible to ensure the large heat transferring area and achieve the smooth flow-down of the liquid working fluid to make a stable contact with the wet tubes. It is therefore possible to improve the heat transfer efficiency from the liquid working fluid, which has absorbed the gaseous working fluid, to the cooling fluid through the wet tubes, so as to make a rapid heat transfer, thus permitting more effective absorption of the working fluid, while preventing re-evaporation of the absorbed working fluid.

According to the present invention, by forming the supply port for the gaseous working fluid on the side surface of the shell so as to communicate with the lower portion of the intermediate zone and forming the discharge port for the gaseous working fluid thereon so as to communicate with the upper portion of the intermediate zone, it is possible to make a flow of the gaseous working fluid as an ascending current so that the gaseous working fluid can flow from the upper portion of the intermediate zone to the lower portion thereof, thus forming a countercurrent flow relative to the liquid working fluid flowing down. As a result, an effective heat transfer of the gaseous working fluid to the liquid working fluid can be made without causing loss to improve the thermal efficiency. In addition, it is possible to bring the gaseous working fluid into sure contact with the liquid working fluid, thus improving the absorption efficiency.

What is claimed is:

1. An absorber in which working fluid including at least two substances having different boiling points from each other is divided into liquid and gaseous phases to supply separately liquid working fluid and gaseous working fluid so as to bring the gaseous working fluid into contact with the liquid working fluid to absorb the gaseous working fluid, said absorber comprising:

a shell having a box-shape, said shell having an inside that is divided into at least three zones by at least two parallel partition walls that extend across the entire cross-section of said shell, and said at least three zones locating vertically;

a plurality of wet tubes, said wet tubes comprising tubular bodies each having opposite open ends and two surfaces being opposite in parallel to each other at a prescribed distance, said tubular bodies being disposed in parallel with each other in said shell so that a central axis of each said tubular bodies coincide with a vertical direction and said surfaces of said tubular bodies are opposite in parallel to each other, said tubular bodies passing through said at least two parallel partition walls so that the opposite open ends of each of said tubular bodies locate in an uppermost zone and a lowermost zone of said at least three zones of the shell, respectively, and wherein at least two of said partition walls do not touch said wet tubes passing therethrough;

a cooling fluid supply portion communicating with the open end of each of said wet tubes to supply cooling fluid to each of said wet tubes; and a cooling fluid collection portion communicating with the other open end of each of said wet tubes to collect the cooling fluid in the wet tubes and discharge it outside;

a gap having a prescribed distance being formed between each of upper and lower partition walls of said at least two parallel partition walls, which face an intermediate zone locating between other zones of said at least three zones, on the one hand, and an outer peripheral surface of each of said wet tubes passing through said at least two parallel partition walls, on the other hand; and (i) the cooling fluid continuously flowing in said wet tubes, while supplying the liquid working fluid from an outside to the zone locating above said intermediate zone so as to be adjacent thereto so that the liquid working fluid continuously flows down from the gap formed between said upper partition wall and said wet tubes along the outer peripheral surface of each of the wet tubes and the liquid working fluid flows through the gap formed between said lower partition wall and said wet tubes to the zone locating below said intermediate zone so as to be adjacent thereto and is discharged outside, and (ii) the gaseous working fluid is supplied from the outside to the intermediate zone of said shell so as to come into contact with the liquid working fluid flowing on the outer peripheral surfaces of the wet tubes; and wherein a supply port for the gaseous working fluid is formed in said intermediate one so as to communicate with a lower portion of said intermediate zone and a discharge port for the gaseous working fluid, which has not been absorbed, is formed in said intermediate zone so as to communicate with an upper portion of said intermediate zone.

2. The absorber as claimed in claim 1, wherein:

each of the surfaces of said wet tubes has a pattern of irregularity, said pattern of irregularity having a common concavo-convex shape to each other and an inverse relationship in concavo-convexities that appear on a working fluid-side and a cooling fluid-side, said concavo-convex shape having a wavy cross section, which extends in a flowing direction of the liquid working fluid in a shape of elongated projections or grooves that are arranged in parallel with each other in a perpendicular direction to said flowing direction by a prescribed pitch.

3. In an absorber, a plurality of wet tubes comprising tubular bodies each having opposite open ends and two surfaces being opposite in parallel to each other at a prescribed distance, wherein said plurality of wet tubes pass through a plurality of partition walls that extend across the entire cross-section of said absorber, wherein at least two of said partition walls do not touch said wet tubes passing therethrough, said surfaces have patterns of irregularity, said patterns of irregularity having a common concavo-convex shape to each other and an inverse relationship in concavo-convexities that appear on a working fluid-side and a cooling fluid-side, said concavo-convex shape having a wavy cross-section, which extends in a flowing direction of a liquid working fluid in a shape of elongated projections or grooves that are arranged in parallel with each other in a perpendicular direction to said flowing direction by a prescribed pitch.

4. The plurality of wet tubes according to claim 3, wherein said opposite open ends project into an upper-most and lower-most zone of said absorber.

* * * * *

UNITED STATES PATENT AND TRADEMARK OFFICE
CERTIFICATE OF CORRECTION

PATENT NO. : 6,435,484 B1
DATED : August 20, 2002
INVENTOR(S) : Haruo Uehara

It is certified that error appears in the above-identified patent and that said Letters Patent is hereby corrected as shown below:

<u>Title page,</u>
Item [57], ABSTRACT,
Line 10, "discharge" should read -- discharges --.
Line 16, "locating" should read -- located --.

Column 8,
Line 9, "mounted a" should read -- mounted on a --

Signed and Sealed this

Twenty-ninth Day of April, 2003

JAMES E. ROGAN
*Director of the United States Patent and Trademark Office*